United States Patent

Dealey et al.

Patent Number: 5,678,914
Date of Patent: Oct. 21, 1997

[54] CARGO AREA LIGHTING SYSTEM FOR TRUCKS

[75] Inventors: Onward K. Dealey, Waterford; Ben V. Domas, Oakland; Alvin D. McCauley, Holly, all of Mich.

[73] Assignee: Transmatic, Inc., Waterford, Mich.

[21] Appl. No.: 557,958

[22] Filed: Nov. 13, 1995

[51] Int. Cl.⁶ .................................................. F21V 8/00
[52] U.S. Cl. .............................. 362/32; 362/80; 362/833
[58] Field of Search ........................... 362/26, 32, 61, 362/74, 80, 83.3; 385/901

[56] References Cited

U.S. PATENT DOCUMENTS

| | | | |
|---|---|---|---|
| 2,101,748 | 12/1937 | Michel et al. | 240/7.1 |
| 2,587,807 | 3/1952 | Arenberg et al. | 240/7.35 |
| 4,740,870 | 4/1988 | Moore et al. | 362/32 |
| 4,811,172 | 3/1989 | Davenport et al. | 362/61 |
| 4,947,293 | 8/1990 | Johnson et al. | 362/32 |
| 5,050,047 | 9/1991 | Viner et al. | 362/32 |
| 5,122,933 | 6/1992 | Johnson | 362/32 |
| 5,184,883 | 2/1993 | Finch et al. | 362/32 |
| 5,483,427 | 1/1996 | Dealey, Jr. et al. | 362/32 |
| 5,495,400 | 2/1996 | Currie | 362/80 |

FOREIGN PATENT DOCUMENTS 976524  11/1964  United Kingdom ............ 362/32

Primary Examiner—Y. My Quach
Attorney, Agent, or Firm—Reising, Ethington, Bernard & Perry, PLLC

[57] ABSTRACT

A lighting system using piped light is provided for the cargo space of a truck. A light source mounted on the truck body is energized by the truck electrical system through a switch in the cab. Plural lighting fixtures are mounted to the roof of the truck body for illuminating the cargo space. Each lighting fixture receives light which is piped through a separate light pipe from the source to the fixture. There are two sets of lighting fixtures each of which is disposed in a linear array extending along a line from the front to the rear of the truck body. The light pipes for one set of lighting fixtures are all disposed in a first enclosure and the light pipes for the other set of lighting fixtures are all disposed within a second enclosure. Certain sections of the enclosures are provided with a transparent lens and certain light pipes within the enclosures emit side light through the lens. A lighting fixture at the rear door of the truck body is provided with an optical switch for turning the lighting fixture on or off.

13 Claims, 3 Drawing Sheets

CARGO AREA LIGHTING SYSTEM FOR TRUCKS

FIELD OF THE INVENTION

This invention relates to truck lighting systems; more particularly, it relates to a lighting system for the cargo handling area of a truck using piped light.

BACKGROUND OF THE INVENTION

As is well-known, trucks having fully enclosed cargo space within the truck body are provided with a lighting system to facilitate loading and unloading of the cargo. Typically, the truck body, especially with long haul trucks, is long relative to its height and width to provide the desired cargo capacity. The longstanding practice in lighting the interior of the truck body has been to use a plurality of incandescent lamps mounted in the roof of the truck body and spaced from each other from front to rear. Typically, the lighting fixtures comprise a lamp housing recessed into the roof and enclosing an incandescent lamp and having a light distributing lens disposed on the housing between the housing and the cargo space so it is generally flush with the interior surface of the roof. This arrangement provides the required illumination without the light fixture intruding into the cargo space.

The conventional incandescent lighting system described above has been found to be unsatisfactory because it is wasteful of energy, requires ongoing maintenance and is sometimes used in such a manner that constitutes a fire hazard. In refrigerated trucks, i.e. those which have a refrigeration system for the cargo space, the heat that the incandescent lamps generate is largely dissipated into the refrigerated cargo space thus requiring more energy for refrigeration. Also, it is known that some truck drivers like to increase the illumination in the cargo space by replacing the standard low wattage incandescent lamps with higher wattage lamps resulting in increased heat generation and shortened bulb life. This practice adds to bulb replacement cost in maintaining the lighting system. Additionally, the conventional incandescent lighting system constitutes a fire hazard, especially when the truck body is loaded with cargo close to the incandescent lamp fixtures and the lights are inadvertently left on for a long time. Such conditions can cause truck fires which are not only dangerous to life and limb but also constitute increased costs to the trucking industry by reason of loss and increased insurance premiums.

There has been a longstanding need in the trucking industry for a safe, effective and energy efficient lighting system for the cargo space in a container body of a truck.

In the prior art, certain fiber optic or "light pipe" systems have been proposed for use on vehicles. The Johnson et al. U.S. Pat. No. 4,947,293 granted Aug. 7, 1990 discloses a clearance lighting system for a semi trailer cargo container body. The lighting system includes a core light conducting material in the form of an elongated light conducting strip provided with a cladding material to provide a light guide. The core and cladding are constructed to provide lateral light emission as well as longitudinal propagation. A light source is adapted to end-illuminate the light guides for both sides of a container body from a single light source. A similar system which also provides a message panel is disclosed in Johnson U.S. Pat. No. 5,122,933 granted Jun. 16, 1992.

The Moore et al. U.S. Pat. No. 4,740,870 granted Apr. 26, 1988 describes a fiber optic lighting system for boats. In this system, a plurality of fiber optic cables extend from a central light source to respective plurality of remote light fixtures to provide lighting at different locations on the boat.

The Davenport et al. U.S. Pat. No. 4,811,172 granted Mar. 7, 1989 describes an optical fiber lighting system particularly suited for automobiles and air craft. The lighting system comprises subsystems suitable for high and low beam illumination and rear illumination of an automobile. Each subsystem comprises a high intensity light source coupled to one end of each of a plurality of light pipes with each having its other end positioned relative to a reflective element and a lens. The reflective elements are arranged to provide a prescribed illumination pattern.

The Finch et al. U.S. Pat. No. 5,184,883 granted Feb. 9, 1993 discloses an automobile lighting system similar to that described in the above-referenced Davenport U.S. Pat. No. 4,811,172. The Finch et al. patent describes an indicating device that comprises a shutter having an opaque portion, a light blocking position in which the opaque portion blocks the passage of light from the output end of a light guide to a lens and a non-blocking position in which light is allowed to pass through the indicating device to the lens.

U.S. patent application Ser. No. 08/327,202 (the '202 application) U.S. Pat. No. 5,483,427, assigned to the assignee of the present invention, describes a cargo area lighting system for trucks using piped light. The '202 application discloses a light source mounted on the truck body and plural lighting fixtures mounted to the roof of the truck body. Each lighting fixture receives light which is piped through a separate light pipe from the source to the fixture. Two sets of lighting fixtures are disposed in linear arrays extending along a line from the front to the rear of the truck body. The light pipes for one set of lighting fixtures are all disposed within a first enclosure and the light pipes for the other set of lighting fixtures are all disposed within a second enclosure. Certain sections of the enclosures have transparent lenses and certain light pipes within the enclosures emit side light through those lenses. A lighting fixture at the rear door of the truck body has an optical switch for turning the lighting fixture on or off.

A general object of this invention is to provide an improved lighting system for the cargo space of a truck which overcomes certain disadvantages of the prior art.

SUMMARY OF THE INVENTION

In accordance with this invention, an improved lighting system is provided for the cargo space of a truck body. The lighting system provides desired levels of illumination throughout the cargo space by using a piped light system which is highly efficient, simple and economical to install without intruding significantly into the cargo space and which requires little maintenance. By using light piped into the cargo space there is virtually no heat dissipation from the lighting system in the cargo space and therefore waste of energy in refrigerated truck bodies is avoided, as compared with incandescent lamps. Further, the risk of fire hazard from the lighting system is eliminated.

In accordance with the invention, the lighting system for the interior of a truck body comprises an electrically energized light source mounted on the truck body, elongated enclosures which both support the light pipes along their lengths and which transmit laterally-emitted light from the light pipes into the cargo space. The enclosures include integral mounting flanges adapted to fasten the enclosure to one of the floor, side walls, front wall, rear wall and roof. The integral mounting flanges allow the light fixtures to be easily assembled into a new truck body or retrofit into the cargo space of an existing truck body.

A complete understanding of this invention may be obtained from the detailed description that follows taken with the accompanying drawings.

BEST MODE FOR CARRYING OUT THE INVENTION

Figure 1:
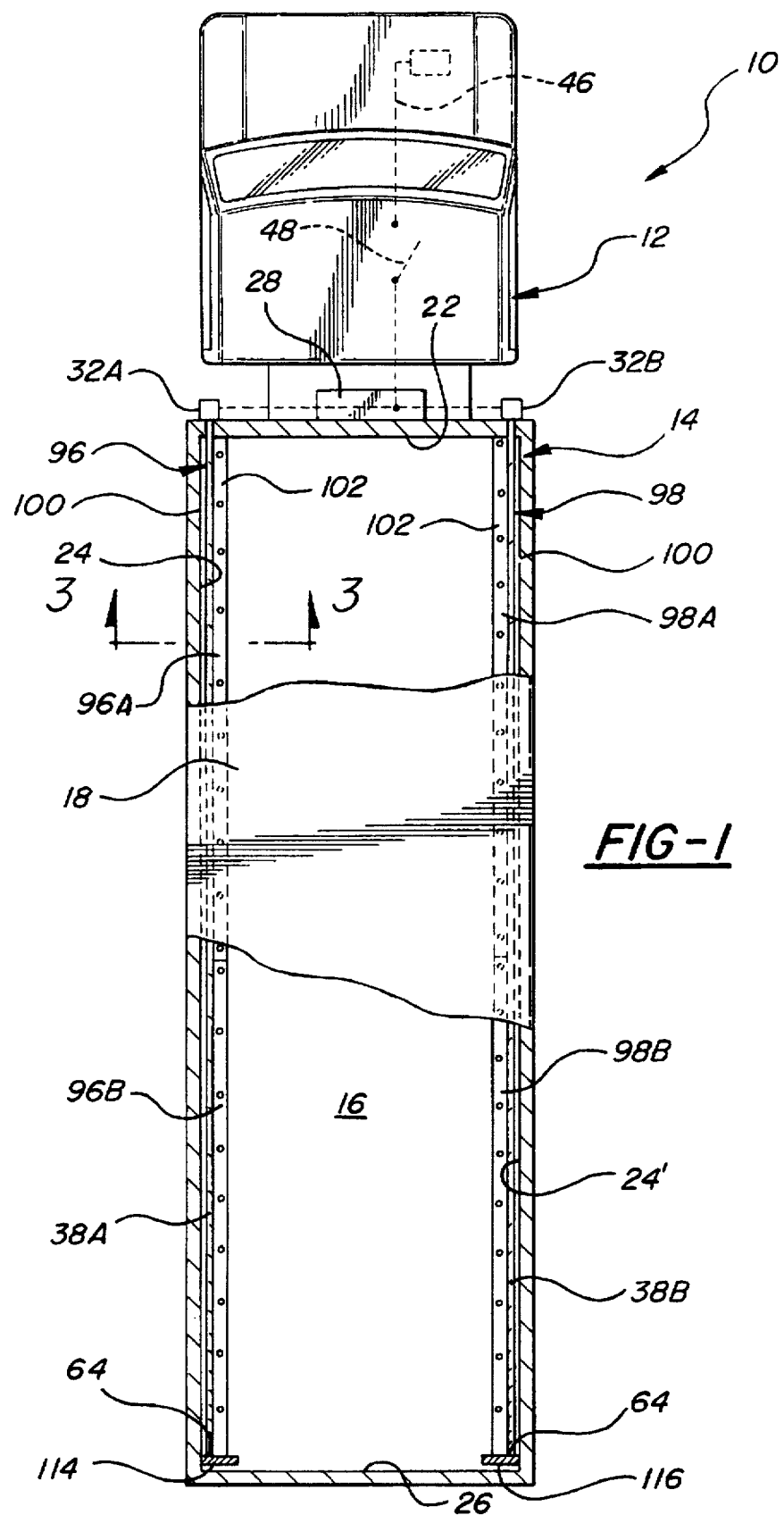
FIG. 1 is a partially cut-away cross-sectional schematic plan view of the lighting system.

Referring now to the drawings, there is shown an illustrative embodiment of the invention in a truck body interior lighting system using piped light. It will be appreciated as the description proceeds that the invention may be used in other applications and may be realized in different embodiments.

FIG. 1 shows a trailer truck, generally shown at 10, having a cab and a truck body, generally indicated at 12 and 14, respectively. The truck body includes a floor 16, a roof 18, a front wall 22, side walls 24 and 24' and a rear wall 26. The truck body 14 encloses a cargo space which is refrigerated by a refrigeration unit 28.

Figure 2:
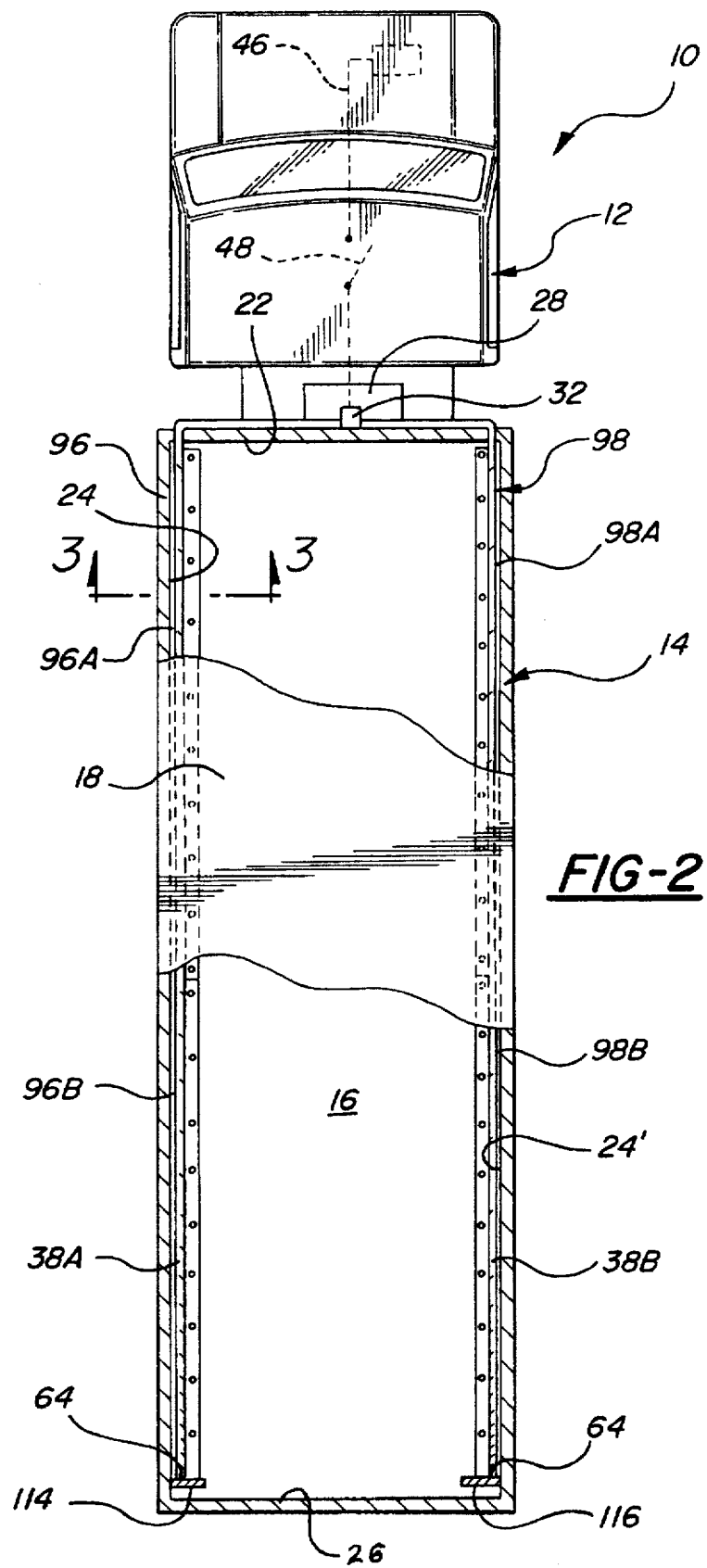
FIG. 2 is a partially cut-away cross-sectional schematic plan view of an alternative installation of the third embodiment of the lighting system.

As shown in FIG. 2, the lighting system for the cargo space, in accordance with this invention, comprises at least one light source 32 suitably mounted on the exterior of the front wall 22 above the refrigeration unit 28. A first embodiment of the lighting system, shown in FIG. 1, comprises two light sources 32A, 32B mounted on the exterior of the front wall 22 on either side of the refrigeration unit 28. A second embodiment of the lighting system, shown in FIG. 2, comprises a single light source 32 mounted on the exterior of the front wall 22 above the refrigeration unit 28. Further, both the first and the second embodiments of the lighting system comprise two light pipes 38A, 38B, each of which extends from the light source to a point adjacent the back wall 26. Both the first and the second embodiments also include a pair of light pipe enclosures, generally indicated at 96 and 98, respectively, which each contain a single light pipe. The enclosure 96 includes enclosure sections 96A and 96B and the enclosure 98 includes enclosure sections 98A and 98B. The first embodiment of FIG. 1 shows enclosures 96 and 98 extending from two separate light sources, 32A and 32B, respectively. The second embodiment of FIG. 2 shows enclosure 96 extending from the same light source 32 as enclosure 98.

The aforementioned components of the lighting system will now be described in greater detail.

The light source 32 (32A and 32B in the second embodiment) comprises a high intensity lamp of the type described in the Robbins et al. U.S. Pat. No. 4,704,660 granted Nov. 3, 1987. Such light sources are available from General Electric Company and Lumenyte International Corporation. Light sources of this type are commonly known as "light engines". The light source 32 is provided with a plurality of light ports each of which is adapted for optical coupling with a light pipe in a well-known manner. A light source is energized from the truck electrical system through an electrical conductor 46 which includes a manually actuable switch 48 mounted in the cab for operation by the driver. The light source includes a voltage inverter for developing a high voltage alternating current supply from the low voltage DC supply from the truck.

The light pipes 38A and 38B are light conductors of the type constructed of polymeric material with a suitable cladding. The light pipes are preferably of the type known as solid core semi-rigid fiber optics such as that described in Zarian U.S. Pat. No. 4,957,347 granted Sep. 18, 1990. Such light pipes are available from the Lumenyte International Corporation. The light pipes are commonly referred to individually as an "optic". The preferred light pipe for this invention is of a type identified as side-light fiber optic because it has the property of emitting light radially through the cladding around the core and also conducts light axially for emission through the end of the core (referred to herein as a side-fire/end-fire light pipe). It will be understood that the lighting system of the first embodiment of this invention may also use light pipes extending between the light source and selected ones of the end-fire light fixtures which do not provide side light emission but instead emit light only from the output end (referred to herein as end-fire light pipes).

Each of the light pipes has an input end coupled with one of the ports of the light source and has an output end.

As shown in FIGS. 1, 2, 3 and 4, the elongated light pipe enclosures 96, 98 of the first and second embodiments are each disposed around and supporting one of the light pipes 38A, 38B. Each enclosure 96, 98 is formed in two elongated, approximate 12 foot segments 96A, 96B, 98A, 98B. The segments are disposed end-to-end in pairs, with a single light pipe 38A, 38B extending through each pair.

All of the first and second embodiment enclosure sections 96A, 96B, 98A, 98B are of the same construction. Accordingly, description of only enclosure 96A will suffice and will be given with reference to FIG. 3.

Figure 3:
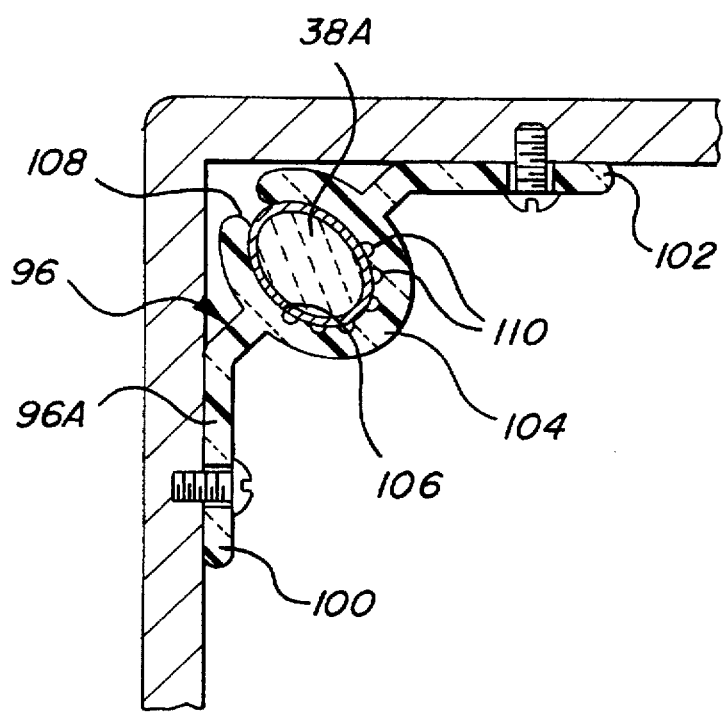
FIG. 3 is a cross-sectional view of an enclosure of the embodiments of FIGS. 1 and 2 taken along line 3—3 of either FIG. 1 or FIG. 2.

As is best shown in FIG. 3, the light pipe enclosure section 96A of the first and second embodiments includes a pair of elongated mounting flanges 100, 102 adapted to fasten each enclosure section into one of the upper corners formed where the side walls 24, 24' and roof meet. Enclosure section 96A is made of light transmissive material to allow laterally-emitted light from light pipe 38A to pass into the cargo space.

The light transmissive material forms a light-transmitting panel 104 that is shaped to form a tubular conduit 106 for supporting the light pipe 38A. The conduit 106 includes an elongated longitudinally-oriented slot 108. To install light pipe 38A in enclosure section 96A, an installer need only snap the length of light pipe 38A through the elongated slot 108 and into the tubular conduit 106.

Mounting flanges 100, 102 project in radially opposite directions from one another and integrally extend from the tubular conduit 106 of each enclosure segment on opposite sides of the longitudinal slot 108. The flanges 100, 102 are bent, along their lengths, so that they extend outward at a right angle to one another.

Enclosure section 96A is integrally extruded from a single piece of light-transmissive optical material so as to have an elongated shape of a uniform cross-section along its length. The tubular conduit 106 formed by the light-transmitting panel 104 includes a plurality of elongated parallel light-dispersion grooves 110. The grooves 110 perform the dual function of dispersing light, and hiding scratch marks that often form during the extrusion process.

The first and second embodiment light pipes 38A, 38B are of the same construction. Accordingly, description of only light pipe 38A will suffice and will be given with reference to FIG. 4.

Figure 4:
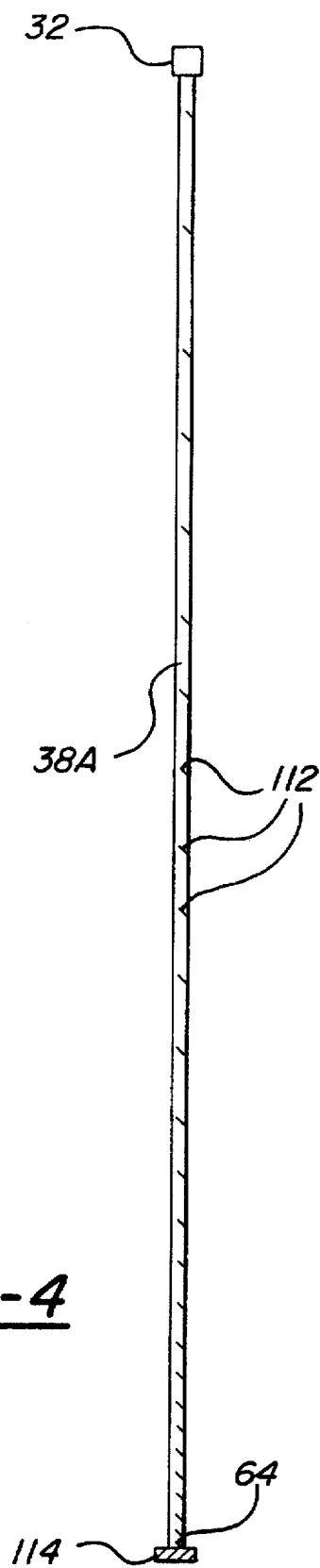
FIG. 4 is a broken-out view of a light pipe of FIG. 1 or 2.

Light pipe 38A includes a cladding with an index of refraction which causes the cladding to emit light laterally. As is best shown in FIG. 4, light pipe 38A includes angled cuts 112 disposed along its length. The cuts 112 have depths, angles & spacing optimized for even light distribution from along the length of light pipe 38A. An end mirror 114 is disposed at the output end 64 of light pipe 38A. The mirror 114 is positioned perpendicular to the central longitudinal axis of light pipe 38A.

To operate the lighting system, the truck driver operates the electrical switch 48 to turn on the lighting system to illuminate the cargo space in the truck body. When the switch 48 is turned on the light sources 32A, 32B are energized and emit light from respective ports to the input ends of the light pipes 38A and 38B.

Each light pipe 38A, 38B conducts light along its length while emitting light laterally through its respective enclosure sections 96A, 96B, 98A, 98B into the cargo space. Light is laterally emitted at a greater intensity at those points where diagonal cuts 112 are located. Light that is not laterally emitted is conducted to the output end 64 of each light pipe 38A, 38B and is reflected back into each light pipe 38A, 38B by mirrors 114, 116 so that no light is lost from the output ends 64.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A light system for a container having a plurality of interior container surface defining a cargo space for accommodating materials including explosive, flammable and heat-sensitive substances, said lighting system comprising:
   an electrically energized light source;
   a light pipe having an input end and an output end and adapted to transmit light received at said input end to said output end, said light pipe adapted to emit light laterally along its length, said light pipe input end being optically coupled to said light source for receiving light therefrom;
   an elongated light pipe enclosure disposed around and supporting said light pipe, said enclosure comprising an elongated light transmitting conduit embracing said light pipe along its length to support said light pipe while transmitting laterally-emitted light from said light pipe into the cargo space, said enclosure additionally comprising two mounting flanges extending integrally outward from said conduit; and
   an elongated access slot extending along the length of said conduit and receiving said light pipe in force-fit snap-in engagement along the length of said light pipe, the mounting flanges fastening to the interior container surfaces, and said slot passing between said mounting flanges and securing the light pipe within the conduit so that the light pipe can not be dislodged from the conduit.

2. A lighting system as defined in claim 1 wherein said conduit has an elongated tubular shape.

3. A lighting system as defined in claim 1 wherein said light pipe includes a cladding with an index of refraction which causes said cladding to emit light laterally thereof.

4. A lighting system as defined in claim 1 wherein said light pipe includes angled cuts spaced apart along its length.

5. A lighting system as defined in claim 4 wherein the space between said angled cuts decreases as a distance along said light pipe between said angled cuts and said input end increases.

6. A lighting system as defined in claim 1 including an electrical energizing circuit connected to said light source; and
   a manually actuated switch electrically connected in said circuit and mounted outside the container for an operator to use in turning said light source on and off.

7. A lighting system as defined in claim 1 wherein said conduit includes a plurality of elongated longitudinally-oriented parallel light-dispersion grooves.

8. A lighting system as defined in claim 1 wherein said enclosure comprises at least two elongated segments disposed end-to-end, said light pipe extending through both segments.

9. A lighting system as defined in claim 8 wherein each segment comprises light transmissive material and each segment is integrally extruded from a single piece of said light transmissive material.

10. A lighting system for container having a plurality of interior container surfaces defining a cargo space for accommodating materials including explosive, flammable and heat-sensitive substances, said lighting system comprising:
    an electrically energized light source;
    a light pipe having an input end and an output end and adapted to transmit light received at said input end to said output end, said light pipe adapted to emit light laterally along its length, said light pipe input end being optically coupled to said light source for receiving light therefrom; and
    an elongated light pipe enclosure disposed around and supporting said light pipe, said enclosure comprising a mounting flange configured to fasten said enclosure to the interior container surface, said enclosure comprising an elongated light transmitting panel integrally extending from said flange and embracing said light pipe along its length to support said light pipe while transmitting laterally-emitted light from said light pipe into the cargo space, said light-transmitting panel including a plurality of elongated longitudinally-oriented parallel light-dispersion grooves formed longitudinally along said panel.

11. A lighting system for container having a plurality of interior container surface defining a cargo space for accommodating materials including explosive, flammable and heat-sensitive substances, said lighting system comprising:
    an electrically energized light source;
    a light pipe having an input end and an output end and adapted to transmit light received at said input end to said output end, said light pipe adapted to emit light laterally along its length, said light pipe input end being optically coupled to said light source for receiving light therefrom; and
    an elongated light pipe enclosure disposed around and supporting said light pipe, said enclosure comprising a mounting flange configured to fasten said enclosure to the interior container surface, said enclosure comprising an elongated light transmitting panel integrally extending from said flange and embracing said light pipe along its length to support said light pipe while transmitting laterally-emitted light from said light pipe into the cargo space, said light pipe adapted to emit light from said output end, said lighting system including an end mirror disposed adjacent said light pipe output end, said mirror positioned to reflect light from said output end back into said light pipe.

12. A lighting system for container having a plurality of interior container surfaces defining a cargo space for accommodating materials including explosive, flammable and heat-sensitive substances, said lighting system comprising:

an electrically energized light source;

a light pipe having an input end and an output end and adapted to transmit light received at said input end to said output end, said light pipe adapted to emit light laterally along its length, said light pipe input end being optically coupled to said light source for receiving light therefrom; and an elongated light pipe enclosure disposed around and supporting said light pipe, said enclosure comprising a mounting flange configured to fasten said enclosure to the interior container surface, said enclosure comprising an elongated light transmitting panel integrally extending from said flange and embracing said light pipe along its length to support said light pipe while transmitting laterally-emitted light from said light pipe into the cargo space, said enclosure comprising at least two elongated segments disposed end-to-end, said light pipe extending through both segments.

13. A lighting system as defined in claim 12 wherein each said segment comprises light transmissive material and each said segment is integrally extruded from a single piece of said light transmissive material.

* * * * *

UNITED STATES PATENT AND TRADEMARK OFFICE
CERTIFICATE OF CORRECTION

PATENT NO.    :    5,678,914

DATED         :    October 21, 1997

INVENTOR(S)   :    Onward K. Dealey, et al.

It is certified that errors appear in the above-identified patent and that said Letters Pate is hereby corrected as shown below:

Column 3, line 10, delete "third embodiment of the "  Column 5, line 32, delete "surface" a insert therefor --surfaces--.  Column 6, line 43, delete "surface" and insert therefor --surfaces--.

Signed and Sealed this

Twenty-eighth Day of July, 1998

*Attest:*

BRUCE LEHMAN

*Attesting Officer*        *Commissioner of Patents and Trademarks*